March 19, 1940.   M. KLAVÍK   2,194,396
AIR SUPPLY DEVICE FOR AIR-COOLED REAR-ENGINED AUTOMOBILES
Filed Dec. 20, 1938
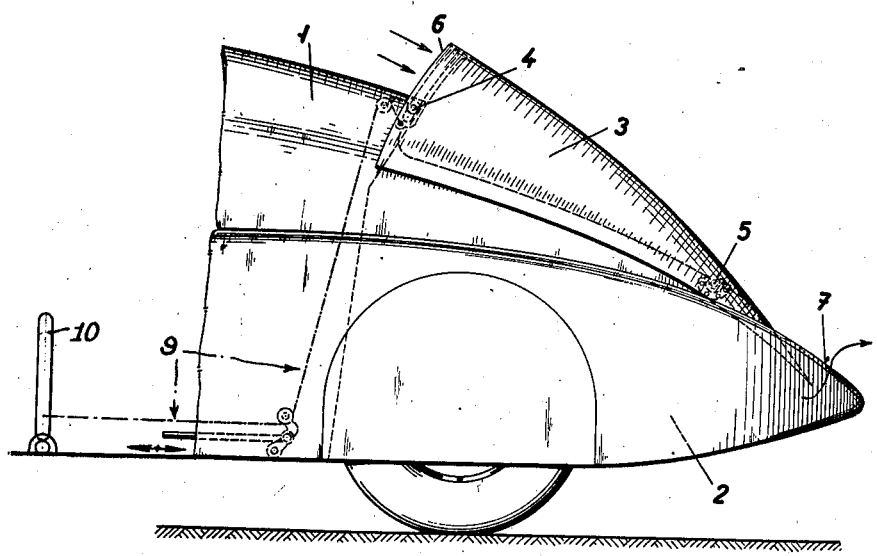
Inventor
Milos Klavík
By Bilinger, Atty.

Patented Mar. 19, 1940

2,194,396

UNITED STATES PATENT OFFICE 2,194,396

AIR SUPPLY DEVICE FOR AIR-COOLED REAR-ENGINED AUTOMOBILES

Miloš Klavík, Prague, Czechoslovakia

Application December 20, 1938, Serial No. 246,923
In Czechoslovakia December 1, 1937

4 Claims. (Cl. 180—54)

This invention relates to a device for supplying cooling air to rear engined automobiles which are fitted with streamlined carriage bodies. The difficulty of cooling the engine in the case of streamlined carriage bodies of automobiles with rear engines consists mainly in the openings, projections and conduits arranged at the rear part of the carriage body supplying only a little air to the engine under the pressure of the flow, so that fans must be used which consume a comparatively large proportion of the power output of the engine. Sufficiently large inlet openings for the cooling air would prejudice the appearance of the carriage body and furthermore the size of these openings corresponding to a particular speed would not correspond to other speeds of the automobile.

According to the present invention, these defects are obviated by the actual engine bonnet being itself used to effect the supply of air, it being arranged oscillatably about an axis located in the vicinity of the rear end of the bonnet. The movement of the bonnet may take place either through a lever from the driver's position or the cover may be actuated corresponding to movements of a pedal or of gear changing lever.

The arrangement of an engine bonnet for cooling purposes according to this invention, is shown diagrammatically in the accompanying drawing.

In the rear part 1 of the carriage body, the engine space 2 is covered by the bonnet 3. This bonnet is ocillatable about the front pivots 4 for the purpose of lifting it open when inspecting the engine and is also oscillatable about the rear pivots 5 whereby the front end can be somewhat raised and a transverse aperture 6 be formed, through which the outer air can penetrate into the engine space 2. In the oscillation of the bonnet about the pivots 5 of its rear end it is lowered somewhat at that point, whereby at the back a transverse opening 7 is created through which the heated air can escape outwards from the engine space. By suitably dividing the engine space, the heated air can be exhausted otherwise, e. g., simply through louvres arranged in the back part of the bonnet. In this case, the pivotal axis of the bonnet is shifted directly to its back edge. The bonnet may be manipulated through the medium of a cable 9 connected to a lever 10 preferably located adjacent the driver's seat.

I claim:

1. In an air-cooled rear-engined automobile, an engine casing, a bonnet covering the casing, means adjacent the rear of the bonnet for oscillatably pivoting the bonnet on the casing and means for raising the bonnet from the driver's position.

2. In an air-cooled rear-engined automobile, an engine casing, a bonnet covering the casing, means adjacent the rear of the bonnet for oscillatably pivoting the bonnet on the casing, means adjacent the front of the bonnet for pivoting the bonnet on the casing for examining the engine and means for raising the bonnet from the driver's position for admitting cooling air.

3. In an air-cooled rear-engined automobile, an engine casing, a bonnet covering the casing, means adjacent the rear of the bonnet for oscillatably pivoting the bonnet on the casing, means adjacent the front of the bonnet for pivoting the bonnet on the casing for examining the engine, a lever adapted to be reached by the driver and means connecting the lever and the bonnet whereby the driver may adjust the bonnet for admitting cooling air.

4. In an air-cooled rear-engined automobile, an engine casing, a bonnet covering the casing, means adjacent the rear of the bonnet for oscillatably pivoting the bonnet on the casing and means for raising the bonnet from a position in the automobile remote from the bonnet.

MILOŠ KLAVÍK.